United States Patent [19]
Douziech et al.

[11] Patent Number: 4,644,388
[45] Date of Patent: Feb. 17, 1987

[54] PROCESS AND CIRCUIT FOR THE DEMODULATION OF CHROMINANCE SIGNALS

[75] Inventors: Patrick Douziech, Rives sur Fures; Michel Imbert, Seyssin, both of France

[73] Assignee: Thomson-CSF, Paris, France

[21] Appl. No.: 679,112

[22] Filed: Dec. 6, 1984

[30] Foreign Application Priority Data

Dec. 9, 1983 [FR] France ............................. 83 19761

[51] Int. Cl.⁴ ....................... H04N 5/455; H04N 9/66
[52] U.S. Cl. ......................................... 358/23; 358/24
[58] Field of Search ................................. 358/24, 23

[56] References Cited
FOREIGN PATENT DOCUMENTS 0037317  7/1981  European Pat. Off. .
56-141681 11/1981 Japan ..................................... 358/24
56-141682 11/1981 Japan ..................................... 358/24
1406438  9/1975  United Kingdom .

OTHER PUBLICATIONS

Funkschau, vol. 43, No. 13, 1er juillet 1971, pp. 409–412, Munchen, DE; M. F. Koubek: "Pal–Decoder ohne Laufzeitleitung" *p. 411, colonne de gauche, lignes 4–18*.

Primary Examiner—Michael A. Masinick
Assistant Examiner—Robert M. Bauer
Attorney, Agent, or Firm—Oblon, Fisher, Spivak, McClelland & Maier

[57]  ABSTRACT

The present invention relates to chrominance decoding circuits and more particularly to a novel circuit for demodulating chrominance signals, B−Y or R−Y. This circuit comprises, connected in series, a multiplier multiplying the U or V-modulated chrominance signal by itself, a filter giving at the output the square $(B-Y)^2$ or $(R-Y)^2$ of the chrominance signal, a device for extracting the square root giving an absolute value $\equiv B-Y\equiv$ or $\equiv R-Y\equiv$ of the chrominance signal, and a multiplier multiplying said absolute value by the sign of the chrominance signal B−Y or R−Y to obtain at the output said chrominance signal, B−Y or R−Y.

3 Claims, 3 Drawing Figures

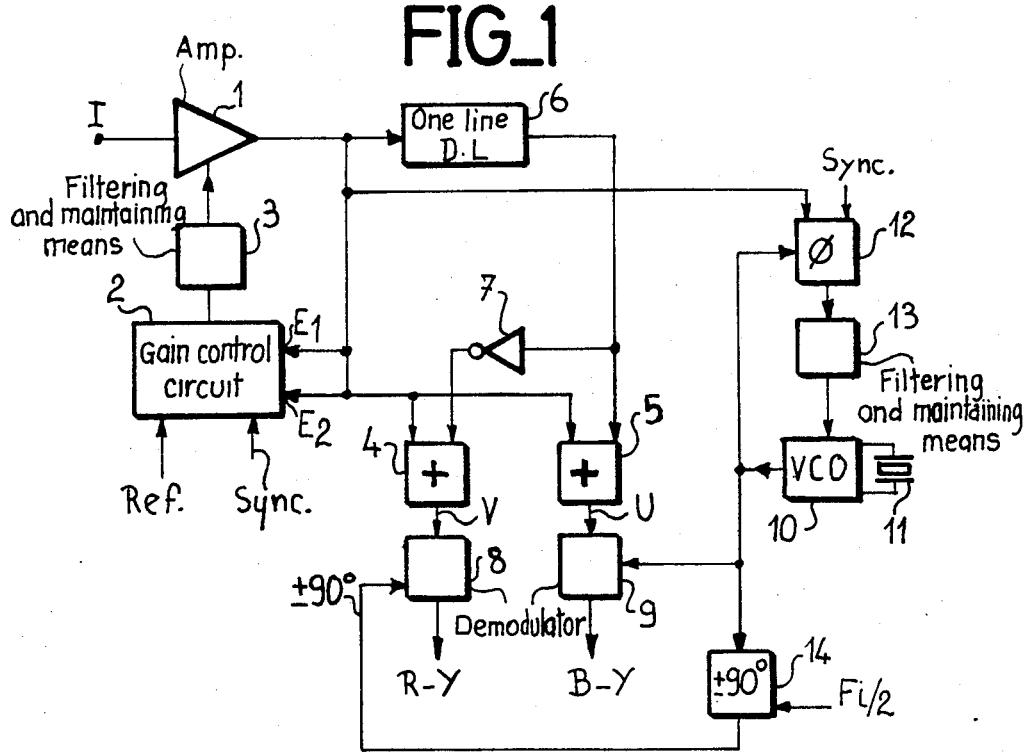
FIG_1
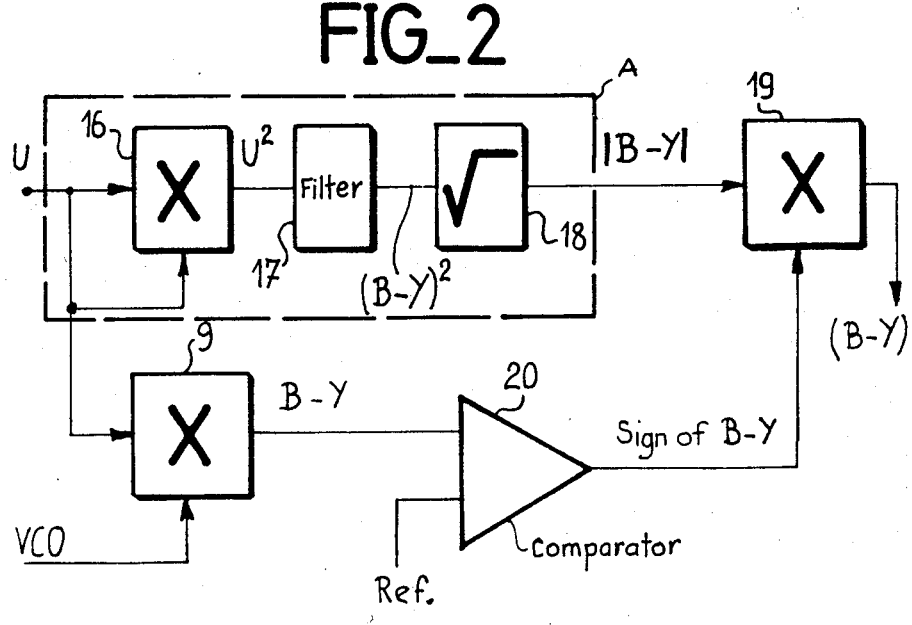
FIG_2

FIG_3
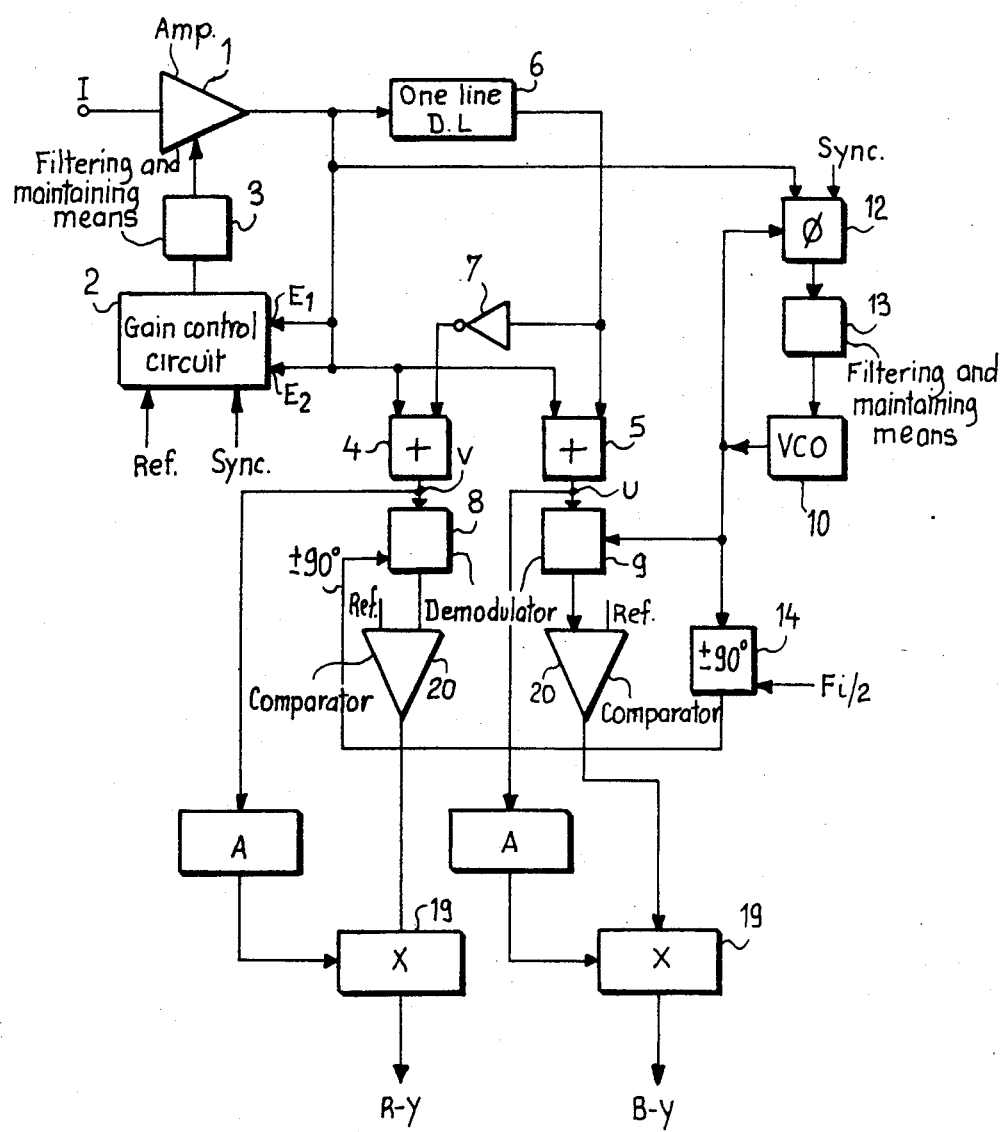

PROCESS AND CIRCUIT FOR THE DEMODULATION OF CHROMINANCE SIGNALS

BACKGROUND OF THE INVENTION

1. Field of the Invention

The present invention relates to the field of colour television circuits and more particularly to chrominance decoding circuits in a colour television receiver using the PAL system or similar systems.

2. Discussion of the Background

In the aforementioned systems, the chrominance information contained in the composite video signal are modulated in amplitude and phase on a given frequency subcarrier. In the case of the PAL system, the frequency of the chrominance subcarrier is standardized at 4.43 MHz and the phase of one of the modulation vectors varies from ±90° from one line to the next. Therefore, in order to obtain chrominance signals B−Y and R−Y, making it possible to reconstitute the colour information, it is necessary to demodulate the chrominance information contained in the composite video signal. This is conventionally carried out by demodulating, in a synchronous demodulator, the U or V-modulated chrominance signal by a signal of the same frequency as the chrominance subcarrier and having a given phase relationship with the transmitted signals. This signal is generally obtained at the output of a local oscillator having a frequency which is as near as possible to the subcarrier frequency, said oscillator being associated with a feedback loop on the transmitted signal.

Thus, very diagrammatically, the chrominance decoding circuit is in the form illustrated in FIG. 1. The latter shows a conventional chrominance decoding circuit of a PAL-DL system, which is the most widely used system in PAL television transmission. In this case, the composite video signal arrives at input I after passing through a filter which eliminates the frequencies too remote from that of the chrominance subcarrier. This signal is then transmitted into an automatic gain control circuit comprising a variable gain amplifier 1 associated with a gain control circuit 2 operating for the duration of a sync signal Sync corresponding to the duration of the presence of the burst signal and controlling the variable amplifier 1 via a filtering and maintaining means 3. The gain control circuit 2 receives the output of the variable amplifier on its first inputs E1 and E2, forms the product thereof and compares this signal with a reference signal Ref for the duration of the burst signal, as was stated hereinbefore. The output of variable amplifier 1 is connected to a first input of adders 4 and 5 and to the input of a line delay 6 ensuring that the signals at frequencies close to that of the chrominance subcarrier are delayed by one line. The output of the delay line 6 is transmitted to the second inputs of adders 4 and 5, with the output of the delay line 6 being fed through the inverter 7 before being sent to the second input of the adder 4. Thus, at the output of adder 4 is obtained the difference between the direct and delayed signals called signal V and at the output of adder 5 their sum which is called signal U. The outputs of adders 4 and 5 are demodulated in synchronous demodulators 8 and 9 which, at their outputs, supply chrominance signals R−Y and B−Y. The synchronous demodulator 9 receives a signal generated by a local oscillator controlled at 4.43 MHz with a certain phase called phase 0° and demodulator 8 receives the same signal, but phase-displaced by ±90°, as a function of the lines.

The controlled local oscillator is constituted by a VCO-type oscillator 10, whose frequency is given by a crystal 11 and a feedback loop on the burst signal. The feedback loop is constituted by a phase comparator 12, followed by a filtering and maintaining means 13. Phase comparator 12 also receives a sync signal Sync which is present throughout the duration of the burst signal. The signal at the output of oscillator 11 is supplied directly to demodulator 9 and via a phase shifter 14 which alternately performs a phase shift of ±90° on demodulator 8.

This type of circuit operates satisfactorily when oscillator 10 is a crystal oscillator. However, it has a certain number of disadvantages due to the presence of the crystal. Thus, the crystal is an expensive component, which cannot be integrated. Therefore, attempts are made to use a crystal-free VCO for obtaining the signal at the frequency of the chrominance subcarrier. However, particularly in the presence of noise, when using crystal-free oscillators a signal with an incorrect phase is obtained, which leads to a reduction in the amplitude of the chrominance signals B−Y and R−Y and causes visible faults on the picture.

SUMMARY OF THE INVENTION

The object of the present invention is to obviate the aforementioned disadvantages by supplying a novel process and a novel circuit for the demodulation of chrominance signals in a PAL television system or the like, which in particular uses crystal-free oscillators.

The chrominance signal demodulation process according to the present invention consists of:

demodulating the U or V-modulated chrominance signal by itself;

filtering the thus obtained signal so as to only retain the square $(B-Y)^2$ or $(R-Y)^2$ of the chrominance signal;

extracting the square root of this signal to obtain the absolute value $|B-Y|$ or $|R-Y|$ of the chrominance signal; and multiplying said absolute value by the sign of the conventionally demodulated chrominance signal B−Y or R−Y in order to obtain the chrominance signal B−Y or R−Y.

The present invention also relates to a circuit for performing the above process. This circuit comprises, connected in series, a multiplier multiplying the U or V-modulated chrominance signal by itself, a filter giving at the output the square $(B-Y)^2$ or $(R-Y)^2$ of the chrominance signal, a device for extracting the square root giving absolute values $|B-Y|$ or $|R-Y|$ of the chrominance signal, a multiplier multiplying said absolute value by the sign of the chrominance signal B−Y or R−Y to obtain at the output said chrominance signal B−Y or R−Y having both a magnitude and a sign.

According to a preferred embodiment, the sign of the chrominance signal B−Y or R−Y is obtained by supplying the chrominance signal B−Y or R−Y, respectively from the demodulator of the U or V signal contained in a chrominance decoding circuit and described with reference to FIG. 1, into a comparator, whose other input is connected to a reference signal equal to 0.

The signal from the conventional demodulator cannot be used for obtaining the demodulated signal, because it contains amplitude faults due to the possibly bad phase of the crystal-free oscillator. However, although the elimination of the crystal leads to a more complex circuit, it makes manufacturing cost savings possible.

BRIEF DESCRIPTION OF THE DRAWINGS

The invention is described in greater detail hereinafter relative to a non-limitative embodiment and the attached drawings, which show:

FIG. 1, already described, in general terms and in block form as an embodiment of a chrominance decoding circuit in a PAL television receiver, and FIG. 2, in block form, which is a demodulation circuit of one of the chrominance signals according to the invention, and FIG. 3, in block form shows the application of two circuits of FIG. 2 to be decoding circuitry of FIG. 1.

DETAILED DESCRIPTION OF THE INVENTION

Throughout the drawings, the same references designate the same elements.

As shown in FIG. 2, the circuit for demodulating one of the chrominance signals, for example, the chrominance signal B−Y is constituted by a multiplier 16 receiving on its two inputs the U-modulated chrominance signal, so as to effect the demodulation of signal Y by itself.

The output signal of multiplier 16 is supplied to a filter 17 for eliminating the second harmonic in order to obtain at the output the square $(B-Y)^2$, of the chrominance signal. The signal, $(B-Y)^2$, is then fed into a square root extractor 18 giving at the output the absolute value $|B-Y|$ of the chrominance signal. It is then necessary to regenerate the sign of the chrominance signal B−Y. For this purpose, signal B−Y is multiplied by the signal representing the sign of the chrominance signal B−Y in a multiplier 19 which gives at the output the chrominance signal B−Y.

The sign of the chrominance signal B−Y can e.g. be obtained by using the demodulator 9 of the decoding circuit of FIG. 1. This demodulator, which performs the demodulation of U by the frequency from a VCO gives B−Y at the output. However, as explained in the introduction to the present specification, when the oscillator is a crystal-free oscillator, a desaturation phenomenon occurs in the case of noisy signals, namely a reduction in the amplitude of signal B−Y, which is incompatible with the satisfactory operation of the television receiver. However, this signal can be used for obtaining the sign of B−Y, because the desaturation does not affect the zero passages of the signal, representing all that is necessary for the sign of (B−Y). For this purpose, it is supplied to the input of a comparator 20, whose other input receives a reference signal, Ref, representing zero.

No desaturation phenomenon is observed with the above circuit, because signal U is no longer demodulated by an external signal, whose phase may be incorrect, and is instead demodulated by itself.

An identical circuit is used for effecting the demodulation of signal V and for obtaining the chrominance signal R−Y. These two circuits are positioned at the output, respectively, of adders 5 and 4 in the decoding circuit of FIG. 1. In this case, the VCO has no crystal and the feedback loop has additional circuits for compensating the variation of the central frequency of the oscillator. The FIG. 3 illustrates the utilization of two identical circuits of FIG. 2 in conjunction with the circuitry of FIG. 1. The box marked A in FIG. 3 corresponds to the items 16, 17 and 18 of FIG. 2 as these items are also marked by the box in FIG. 2.

Multipliers 16, 9, 19, filter 17, extractor 18 and comparator 20 are circuits known to the Expert and are preferably in integrated form. They will not be described in a detailed manner in the present description.

In addition, when the amplitude of the chrominance signal B−Y or R−Y is high, compared with the gain of multiplier 9, the latter also fulfills the comparison function and in this case there is no need for a comparator.

What is claimed is:

1. A process for the demodulation of each of chrominance signals B−Y and R−Y, comprising, for each of said chrominance signals, the steps of:
   demodulating a modulated chrominance signal by itself and providing a first output;
   filtering said first output so as to retain the square of said chrominance signal;
   extracting the square root of said retained square of said chrominance value in order to obtain the absolute value of said chrominance signal; and
   multiplying said absolute value by the sign of the chrominance signal obtained by said step of demodulating in order to obtain a final chrominance signal.

2. A circuit for demodulating each of two modulated chrominance signals, comprising, for each modulated chrominance signal;
   a multiplying means for multiplying a modulated chrominance signal by itself in order to obtain a squared value output;
   a filter means being fed with said squared value output and outputting a square of a final unmodulated chrominance signal;
   means for extracting the square root of said square of said final chrominance signal in order to provide an absolute value of said final chrominance signal;
   a second multiplying means for multiplying said absolute value by the sign of the signal output from said first multiplier in order to obtain a final unmodulated chrominance signal have both a sign and a magnitude.

3. A circuit according to claim 2 further comprising a comparator which compares the chrominance signal from said first multiplier means with a reference signal corresponding to zero wherein the output of said comparator provides said sign of said final chrominance signal.

* * * * *